June 12, 1934.   J. J. KANE   1,962,351

MEANS FOR WELDING PIPE

Filed Aug. 24, 1931

JOSEPH J. KANE
INVENTOR

Jesse R Stone
Lester B Clark
ATTORNEYS.

Patented June 12, 1934

1,962,351

UNITED STATES PATENT OFFICE 1,962,351

MEANS FOR WELDING PIPE

Joseph J. Kane, Galveston, Tex.

Application August 24, 1931, Serial No. 558,992

3 Claims. (Cl. 113—103)

The invention relates to an improvement in the means for welding pipe such as the sections of pipe which are used in assembling pipe lines for the transportation of oil, gas and other fluids.

In the present day methods of assembling pipe lines it is usual to weld the ends of the pipe sections together in order to form the line. Various expedients have been resorted to in an attempt to form a simple and economical weld between the pipe ends. In order to obtain a satisfactory weld having sufficient tensile strength, ductility, density and at the same time to form the weld in an economical manner, the usual practice is to slightly bell the ends of the pipe sections and then use what is known as a chill ring. This chill ring is positioned underneath the ends of the pipe sections which have been belled and the ends of the sections are spaced slightly apart so that a bond may be made by the welding material with the chill ring in order to insure a proper weld. The disadvantages of this type of weld are many, the most prominent being the increased cost of forming the bells on the pipe, the uneven surface caused on the inside of the pipe by the bell portions and by the chill ring and the fact that a great quantity of material must be melted during the welding operation in order to fill the large groove occasioned by separating the ends of the pipe a sufficient distance to expose the chill ring.

The acetylene method of welding the pipe ends is most satisfactory but is expensive due to the cost of the process, and it is one of the objects of this invention to provide a means for electric welding plain end or beveled end pipe.

It is one of the objects of the invention to provide a means for welding pipe wherein the chill ring which is positioned beneath the area to be welded is removable so that the inside of the pipe line will be of uniform diameter and free from obstructions.

Another object of the invention is to provide a combination swab and chill ring for use in assembling pipe lines.

Still another object of the invention is to provide an expansible and contractible chill ring for use in welding pipe.

Another object of the invention is to provide a chill ring which will serve to align the pipe ends to be welded and which chill ring will support the area being welded but is adapted for removing after completion of the weld.

It is also an object of the invention to provide a chill ring which will be positioned in one of the pipe ends prior to aligning this pipe section with the sections which have already been welded.

Other and further objects of the invention will be readily apparent to those skilled in the art when the following description is considered in connection with the accompanying drawing, wherein.

Figure 2:
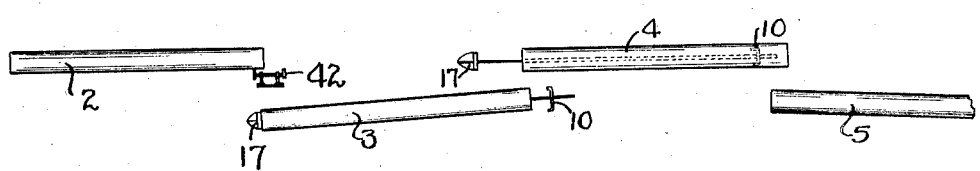
Fig. 2 is a diagrammatic view of the pipe sections to be used in connection with the invention.

By having reference to Fig. 2 a general understanding of the invention may be had and in this figure, 2 represents the last section of a pipe line which is being assembled, this section having been previously attached by welding or otherwise to other sections, it being usual to form these pipe lines in long portions prior to or directly after they have been positioned in the ditch in which they are to be buried. The present invention involves the connecting by welding of the pipe ends of two adjacent sections. The pipe section which is to be next attached to the section 2 is indicated at 3 and this section has been prepared in accordance with this invention prior to its attachment. The section 4 is that section which is to be attached to the section 3 after it has been fixed to the section 2, the section 4 being shown in the process of preparation for assembly, whereas the piece of pipe 5 represents the next section which is to be prepared.

Before a pipe section such as 3, 4, or 5 can be attached to those pipe sections which have already been assembled it is necessary to clean out or swab out the pipe, as these pipe sections have been deposited along the right of way prior to assembly of the line and in many instances various pieces of rubbish, dirt and occasionally small animals will be in the pipe sections. It is, therefore, usual to run a swab through the sections before they are placed on the line. By having reference to Fig. 1 a swab of general form is indicated at 10. This swab consists of a disc 11 having a flange 12 thereon. This flange may be integral with the disc 11 or it may be in the form of a flexible rubber or leather cup or ring attached to the disc. In any event, it is of substantially the same size as the inside diameter of the pipe section and is adapted to be forced through the pipe in order to remove any rubbish or other material which has accumulated in the pipe. It is to be understood that these pipe sections are 20, 30 or 40 feet in length and it is, therefore, necessary to have a rod or pipe of this length attached to the swab 10. Such a rod is indicated at 13 and is preferably secured and rigidly fixed to the swab. Prior to this invention these swabs have been used and as seen in the pipe section 4 of Fig. 2 the swab 10 is about to be passed through the pipe section, whereas the swab 10 has already been passed through the pipe section 3.

Figure 1:
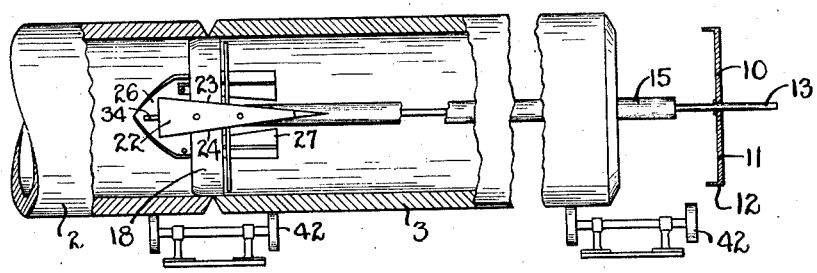
Fig. 1 is a broken detailed sectional view of two pipe sections positioned ready for welding in accordance with the means and method of this invention.

The present invention contemplates the combination with this swab which is used, a chill ring which is arranged for connection to the opposite end of the rod 13, by means of the pipe member 15. This pipe member is concentric with the rod 13 and is arranged for telescopic movement with respect thereto. This pipe 15 is of substantially the same length as the rod 13, but terminates as seen in Fig. 1 adjacent the swab 10. This pipe 15 is used to manipulate the expansible and contractible chill ring which is about to be described.

Figure 3:
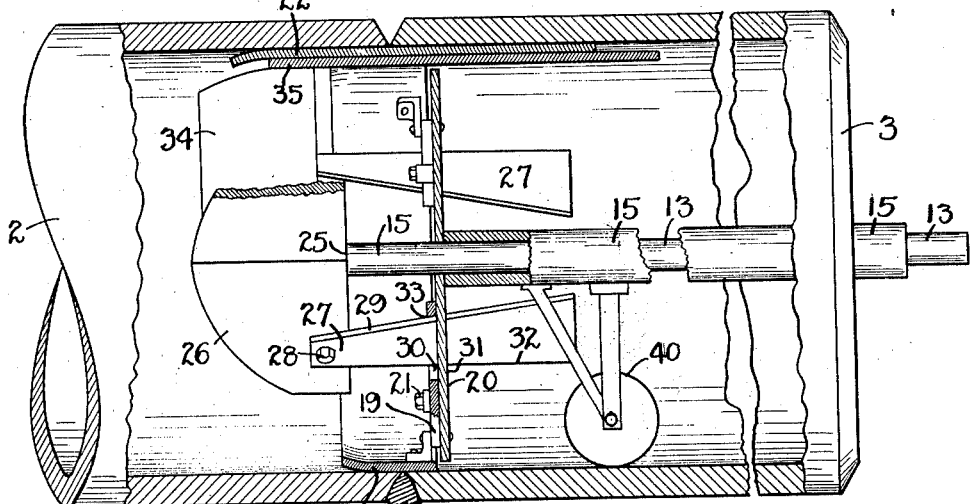
Fig. 3 is a sectional view showing the expansible and contractible chill ring in position beneath an area to be welded, this section having been taken on the line 3—3 of Fig. 4.

As seen in Fig. 2 a chill ring indicated generally at 17 is provided. This chill ring embodies a ring member 18 which is mounted by means of the brackets 19 on a disc 20. The brackets 19 are slotted in order to permit radial sliding movement of the brackets with respect to the bolts or other means 21 which is fixed to the plate or disc 20. This ring 18 is broken at 19 and the break in the ring is filled by means of the wedge 22. This wedge is best seen in Fig. 1 and is of tapered formation in order to be forced between the ends 23 and 24 of the ring 18. It seems apparent that as this wedge is moved to the right as viewed in Fig. 1 that it will cause expansion of the ring and obviously will allow contraction of the ring when it is moved to the left. The ring 18 is carried by the plate 20, to which is fixed the pipe 15. Therefore, when the operator desires to position the ring 18 he does so by movement of the pipe 15. However, when he desires to expand or contract the ring 18 he does so by manipulation of the rod 13 and by relative longitudinal movement between the rod 13 and the pipe 15. This is accomplished by means of the structure shown in Fig. 2, wherein the rod 13 extends through the pipe 15 and through the disc 20 and has attached to the end 25 thereof the flanges or guide wings 26. These wings serve to protect the chill ring when it is being handled about the field and also serve as a support for the contraction wedges 27. These wedges are pivoted to the wings 26 as at 28 and have an inclined inner face 29. These wedges 27 are arranged for insertion in the slots 30 of the brackets 19 and also pass through a slot 31 in the disc 20. Thus when the rod 15, as seen in Fig. 3, goes to the left the guide wings 26 and the wedges 27 will also be moved to the left.

The edge 32 of the wedge will then abut against the outer edge of the slot 31 in the disc 20, whereas the inner face 29 will abut against the inner end 33 of the slot 30 in the bracket 19. In this manner a positive force is applied to the brackets 19 to cause them to move radially inward on the disc 20. Inasmuch as the ring 18 is fixed to the brackets 19, it will be caused to contract and this contracting movement will be permitted due to the fact that the wedge 22 is carried by a flange 34 which is also fixed to the rod 13. As seen in Fig. 3 the wedge 22 is fixed to the wing 34 as at 35. The taper of the wedge 22 and the wedges 27 are so proportioned that the withdrawal of the wedge 22 is accomplished by an equivalent contracting movement of the ring so that the edges 23 and 24 will remain in substantial engagement with the edges of the wedge.

Figure 4:
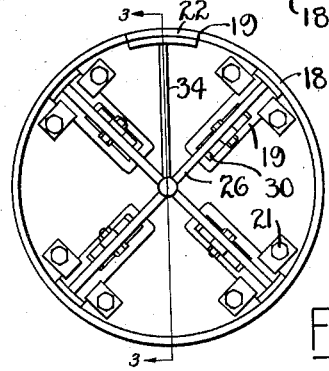
Fig. 4 is an end view of the improved chill ring showing an arrangement of the parts.

Fig. 4 shows an end view of the wings 26, the flange 34 and the arrangement of the wedges 27, four of these wedges having been provided in order to cause a uniform contraction of the chill ring 18, when it is to be withdrawn or inserted in the pipe. The wedge 22 has been illustrated as formed of two parts and this is merely a detail of construction, as it is desirable to have the ring 18 and the wedge 22 formed of copper or some similar material which will readily conduct heat so that the heat absorbed from the particular point where the weld is being made will be quickly conducted away, melting of the material of the ring or the wedge being avoided.

It has been found that with a device of the type such as described herein a smooth uniform inside surface may be obtained at the welded connections due to the fact that the material of the weld is of somewhat different configuration after the weld is completed than the straight sided V groove formed by the pipe ends before the weld. The weld as seen on the lower side of Fig. 3 takes on this configuration due to the fact that the welder first heats the flat sides of the groove and flows the material into the apex of the groove and then after the surfaces of the groove are molten and in condition to receive the material which is to fill the groove the material is then added. In this manner the intense heat of the welding mechanism is not applied directly to the apex of the groove and for this reason does not materially affect the chill ring which must only withstand the heat of the molten material until such time as the ring has had an opportunity to conduct the heat away from the welded area and to chill the welded material. With this in mind the chill ring is made of several times the width necessary in order to underlie the welded area for the purpose of providing a large conducting area to transfer the heat away from the area being welded and to chill the material as it moves into the apex of the groove.

As seen in Fig. 3, a suitable anti-friction device such as the rollers 40 may be provided on the pipe 15 in order to assist the operator in withdrawing the chill ring from the pipe. When it is understood that the pipe section is thirty or forty feet in length and that the chill ring must be withdrawn therefrom after the weld is completed, it seems apparent that a roller such as that illustrated would be of assistance in readily removing the chill ring.

The operation of the invention is as follows:
The pipe section 2 which was last welded to the line being assembled, as seen in Fig. 2, is mounted on a dolly or trunnion 42, which dolly is positioned only partially beneath the end of the pipe section 2. The lining crew have previously thrust the swab 10 through the pipe section 3 until it projects from the end as seen in Fig. 2 and in this manner the chill ring structure 17 has been drawn into the opposite end of the pipe section with the wings 26, part of the wedge 22 and a portion of the chill ring 18 protruding from the end of the pipe section. This section 3 is then placed on the line by positioning the left hand end thereof on the dolly 42 and stabbing the wings 26 of the chill ring into the end of the pipe section 2 so that the pipe sections 2 and 3 will then be as shown in Fig. 1. With the parts in this position one operator will grasp the pipe 15 while the second operator will exert a pull on the rod 13. This causes the wedge 22 to move to the right and engage the ends 23 and 24 of the chill ring, expanding the ring and moving it into engagement with the inner surface of the pipe ends 2 and 3.

In event the pipes are not quite aligned, the expansion of the wing will line the pipes properly and hold them firmly in position ready for the welding operation. As soon as the weld has been completed one of the operators may rap the end of the rod 13 projecting from the pipe section 3 with a hammer or other instrument so that the wedge 22 will be retracted from its position between the ends 23 and 24. This movement of the wedge 22 is accomplished by a similar movement of the wedges 27 which move the brackets 19 radially inward and contract the chill ring 18. This relieves the frictional engagement of the ring with the inside of the pipe and by pulling upon the pipe or handle 15 the entire mechanism may be removed from the pipe section 3. If by chance any articles have been left in the pipe by the swab 10, the disc 20 and the chill ring serve to remove them so that a double swabbing of the pipe is obtained. While these operations have been proceeding with pipe section 3 the lining crew have prepared pipe section 4 and it is now ready to be placed upon the line immediately after the chill ring has been removed from the pipe 3. Thus it is intended that a plurality of these combination swabs and chill rings will be provided so that the lining crew may proceed any desired distance ahead of the welding crew and slight delay in the welding operation will not cause idleness on the part of the lining crew. Because of a considerable number of swabs and chill rings, the lining crew may prepare ahead of time a considerable number of pipe sections.

The present invention has greatly simplified the welding art because it combines a swab and chill ring in such a manner that they may be used simultaneously in the same pipe section. The frictional losses in the pipe line are reduced due to the fact that a smooth inside surface is obtained. The cost of assembling the pipe line is reduced because the amount of material which must be melted and moved with a sharp V groove weld is much less than the material which must be moved with a permanent chill ring weld, which produces an unsatisfactory, uneven interior surface on the pipe.

While one form of the invention has been shown and described, it is contemplated that the particular form of the expansible chill ring may be varied to assume various configurations and arrangements of structure without departing from the spirit of the claims or the invention as here disclosed.

What I claim is:

1. A welding ring for use in welding pipe lines including a disc, a plurality of contracting wedges mounted to slide thru said disc, a one piece chill ring arranged on said disc for radial contraction by said wedges, a guide head disposed adjacent said disc, an expanding wedge carried by said head, and means to move said head and expanding wedge with respect to said ring to expand said ring, said expanding wedge forming a segment of said ring.

2. A welding device for use in welding the meeting ends of pipe sections including a disc to be placed transversely of the pipe, a chill ring of larger diameter than said disc, said ring being split at one point, means to secure said ring to said disc to allow expansion and contraction thereof, an expanding wedge adapted to be moved longitudinally of said ring to expand the same, contacting wedges extending longitudinally through said disc, and adapted to move said chill ring into contracted position, and means upon which said disc is mounted whereby said wedges may be moved to contract or expand said ring.

3. A welding device for welding the meeting ends of pipe sections including a chill ring adapted to fit within said pipe, and split at one point, a supporting disc, means slidable on said disc to engage said ring, means on said disc to engage between the meeting ends of said chill ring and expand the same, means engaging the interior of said ring and operable longitudinally through said disc to contract said ring, and supporting means for said disc whereby said contracting and expanding means may be manipulated.

JOSEPH J. KANE.